United States Patent [19]
Weaver

[11] Patent Number: 5,617,242
[45] Date of Patent: Apr. 1, 1997

[54] REPAIR OF DIGITAL MICROMIRROR DEVICE HAVING WHITE DEFECTS

[75] Inventor: Douglas J. Weaver, Dallas, Tex.

[73] Assignee: Texas Instruments Incorporated, Dallas, Tex.

[21] Appl. No.: 370,746

[22] Filed: Jan. 10, 1995

[51] Int. Cl.$^6$ .................... G09G 3/34; G02B 26/08
[52] U.S. Cl. .............. 359/221; 359/224; 359/225; 359/291; 359/855; 359/900; 345/108
[58] Field of Search ...................... 359/855, 221, 359/224, 225, 291, 295, 900; 345/108, 214

[56] References Cited

U.S. PATENT DOCUMENTS

| | | | |
|---|---|---|---|
| 5,061,049 | 10/1991 | Hornbeck | 359/213 |
| 5,096,279 | 3/1992 | Hornbeck et al. | 359/221 |
| 5,289,172 | 2/1994 | Gale, Jr. et al. | 359/291 |
| 5,387,924 | 2/1995 | Gale, Jr. et al. | 359/291 |
| 5,412,186 | 5/1995 | Gale | 359/900 |
| 5,444,566 | 8/1995 | Gale et al. | 359/291 |
| 5,482,564 | 1/1996 | Douglas et al. | 134/37 |
| 5,504,504 | 4/1996 | Markandey et al. | 345/214 |

*Primary Examiner*—Jon W. Henry
*Attorney, Agent, or Firm*—Julie L. Reed; James C. Kesterson; Richard L. Donaldson

[57] ABSTRACT

A method of repairing mirror elements of a digital micromirror device (DMD) that have become stuck in an "on" position. The mirror element (10) is located and targeted with a laser beam. The wavelength, pulse duration, and power of the radiation is selected so that the mirror component (11) of the defective mirror element (10) will be ablated without affecting the underlying circuitry or neighboring mirror elements (10).

10 Claims, 2 Drawing Sheets

REPAIR OF DIGITAL MICROMIRROR DEVICE HAVING WHITE DEFECTS

TECHNICAL FIELD OF THE INVENTION

This invention relates to digital micro-mirror devices (DMDs), and more particularly to repairing DMDs having mirror elements that are "stuck on".

BACKGROUND OF THE INVENTION

The digital micromirror device (DMD) is a micromechanical device, which may be used as a reflective spatial light modulator. It has an array of rotatable mirrors, fabricated over an address circuit having CMOS memory cells. A typical DMD has mirrors that are 16 micrometers wide on a pitch of 17 micrometers, and that rotate plus or minus 10 degrees from a flat (non-tilted) position.

When a DMD mirror rotates, it touches an underlying landing surface. During manufacture or during operation, mirrors of the DMD may become stuck to this landing surface. The sticking can occur in either direction of the mirror tilt, such that the mirror can be either stuck "off" or stuck "on".

One application of DMDs is image displays, where an array of mirror elements are individually addressed to form images. In such applications, a mirror element that is "off" is always perceived as a black pixel. A mirror element that is stuck "on" is always perceived as a pixel of maximum intensity.

SUMMARY OF THE INVENTION

One aspect of the invention is a method of repairing a digital micromirror device (DMD) having one or more mirror elements in a "stuck on" position. The location of the each mirror element that is "stuck on" is determined, thereby obtaining a map of defective mirror elements. The defective mirror element is irradiated with laser radiation, such that the mirror of the defective mirror element is removed without substantially affecting underlying circuitry of that mirror element or of neighboring mirror elements. For typical mirror elements, the most satisfactory results are with ultraviolet radiation, a pulse duration 30 nanoseconds or less, and a power of 10 microjoules or less for the mirror element "spot size".

An advantage of the invention is that white defects are made less objectionable. DMDs having minor defects can be made useful, with the result of improved yield during manufacture. The method could also be used as a maintenance procedure for DMDs that have been in operation.

DETAILED DESCRIPTION OF THE INVENTION

Figure 1:
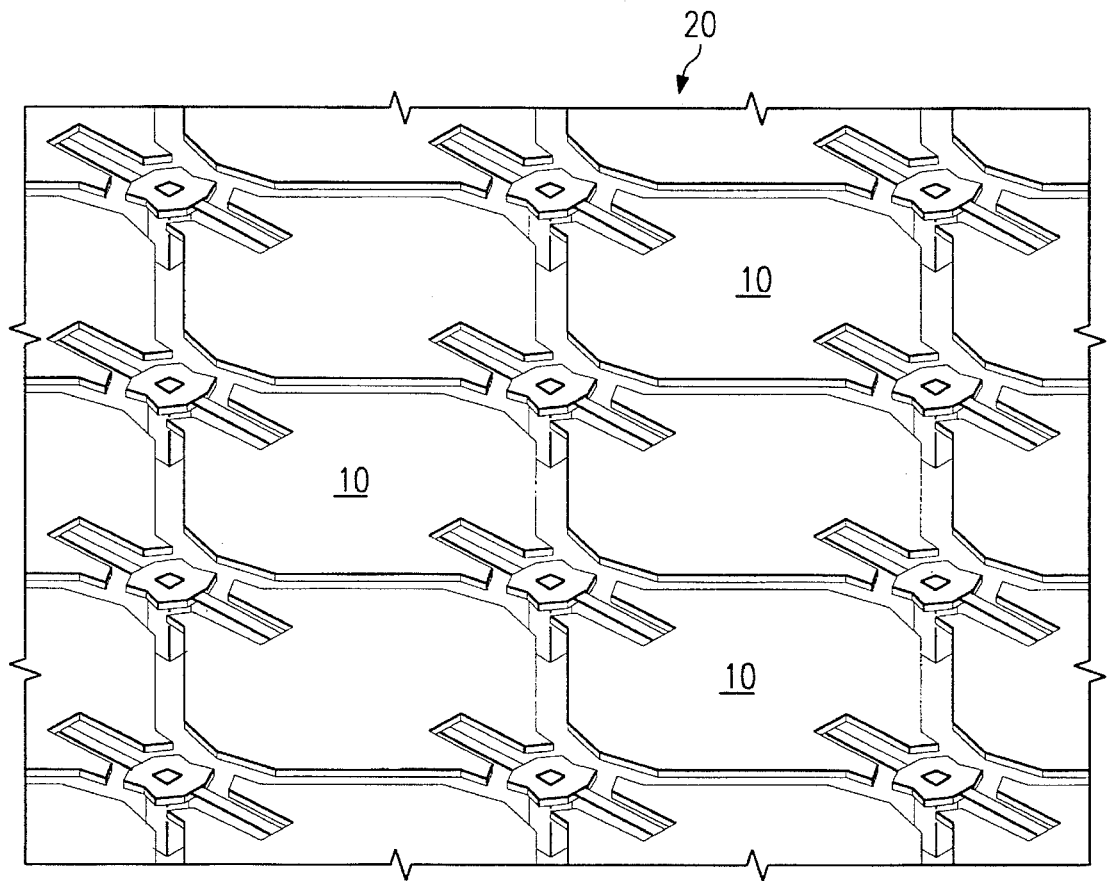
FIG. 1 is a top plan view of a portion of an array of mirror elements, such as are used for a digital micromirror device.

FIG. 1 illustrates a portion of the top surface of an array of mirror elements 10, such as are used for a digital micromirror device (DMD) 10. Each mirror element 10 has a reflective surface, visible in FIG. 1. As explained in the Background, for image display applications, these mirror elements 10 tilt to either an "on" or an "off" position. This invention is directed to repairing DMDs having one or more mirror elements 10 that are stuck in an "on" position.

Figure 3:
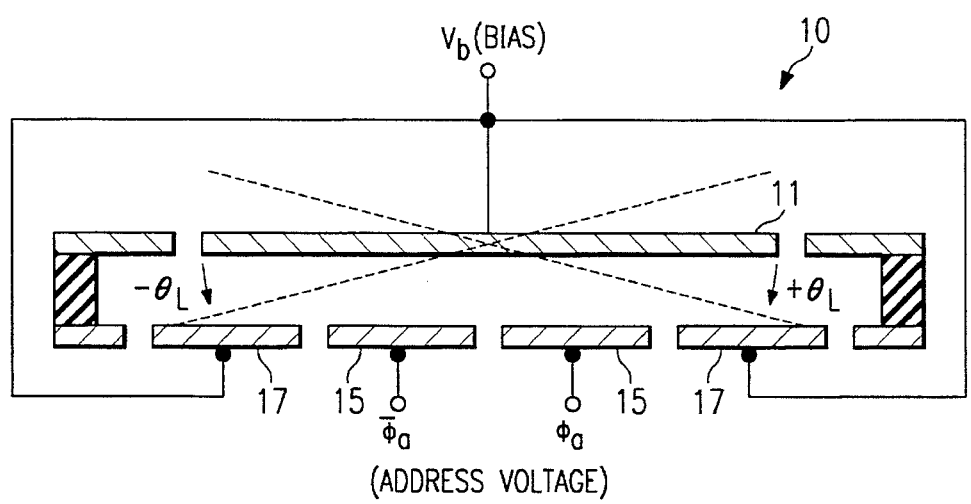
FIG. 3 is a schematic illustration of one of the mirror elements of FIG. 1.
Figure 2:
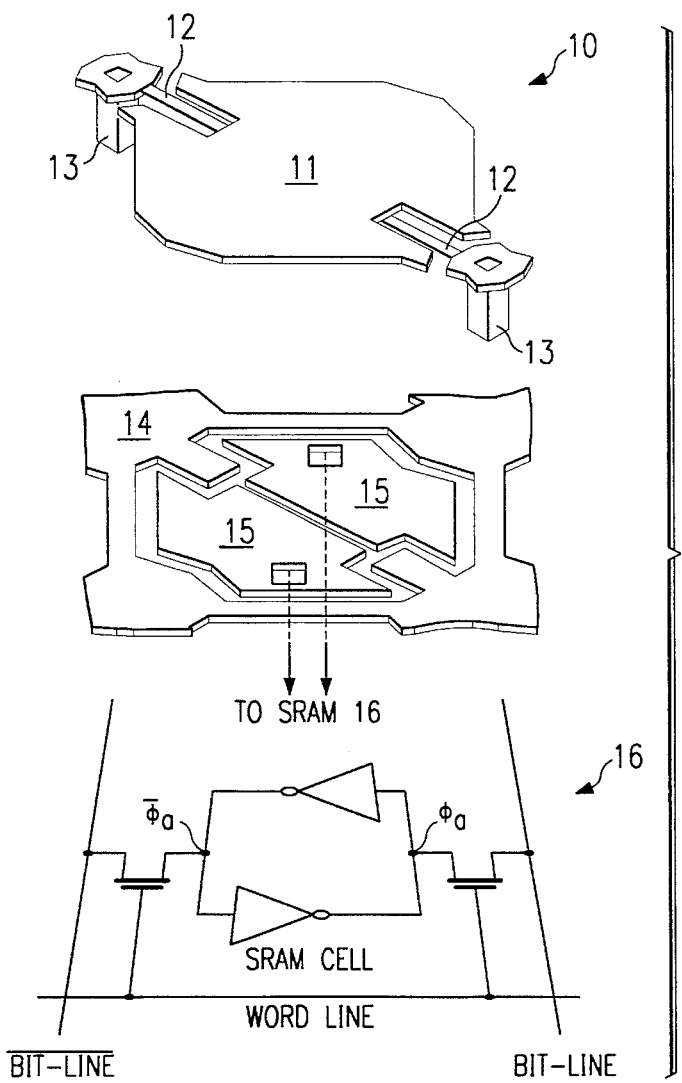
FIG. 2 is an exploded perspective view of one of the mirror elements of FIG. 1.

FIG. 2 is an exploded perspective view of a mirror element 10. FIG. 3 is a schematic cross section of the same mirror element 10. The mirror 11 is suspended over an air gap by two thin mechanically compliant torsion hinges 12. The hinges 12 are supported by posts 13 that are electrically connected to an underlying bias/reset bus 14. This bus 14 interconnects all the mirror elements 10 to a bond pad so that a bias/reset voltage can be applied to the mirrors 11. Underlying the mirrors 11 are a pair of address electrodes 15 that are connected to the complementary sides of an underlying SRAM cell 16. Depending on the state of the SRAM cell 16, the mirror 11 is electrostatically attracted by a combination of bias and address voltage to one of the other of the address electrodes 15. The mirror 11 rotates until its tip touches a landing electrode 17 held at the same potential as the mirror 11. A "1" in the memory cell 16 causes the mirror 11 to rotate +10 degrees. A "0" in the memory cell 16 causes the mirror 11 to rotate −10 degrees.

The mirror element 10 of FIGS. 1–3 is known as a "torsion beam" mirror element. Another type of mirror element is the "hidden hinge" type, whose hinges and hinge support posts are under the mirror. Still other types of mirror elements are cantilever beam types and flexure beam types. Various mirror element types are described in U.S. Pat. No. 4,662,746, entitled "Spatial Light Modulator and Method"; U.S. Pat. No. 4,954,789, entitled "Spatial Light Modulator"; U.S. Pat. No. 4,956,610, entitled "Spatial Light Modulator"; U.S. Pat. No. 5,061,049, entitled "Spatial Light Modulator and Method"; U.S. Pat. No. 5,083,857, entitled "Multi-level Deformable Mirror Device"; and U.S. Patent Serial No. 08/171,303, entitled "Improved Multi-level Digital Micromirror Device". Each of these patents is assigned to Texas Instruments Incorporated, and each is incorporated herein by reference.

Figure 4:
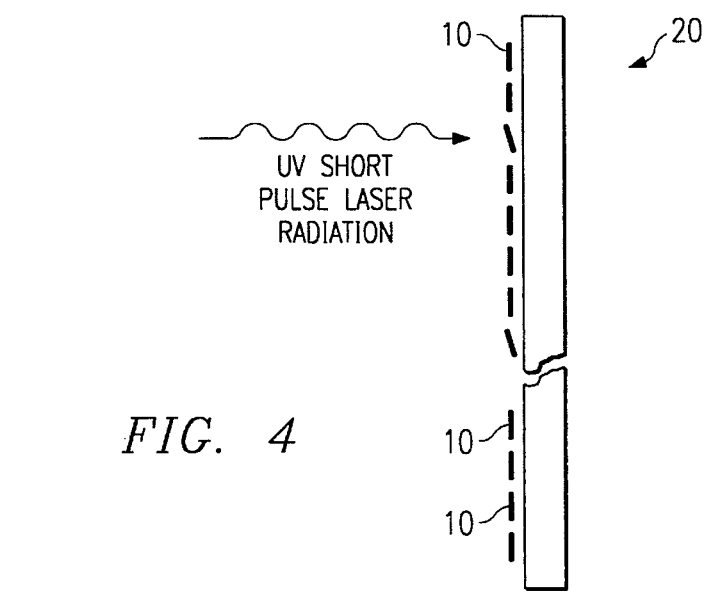
FIG. 4 is a side view of an array of mirror elements, some of which are stuck in an "on" position.

FIG. 4 is a side view of the DMD array 20 of FIG. 1, in which several mirror elements 10 have become stuck in an "on" position. As stated in the Background, where the DMD is used in an image display system, these are "white defect" mirror elements, whose effect on the final image can be perceptible by the viewer as a bright spot.

For repairing white defects, a first step is to determine the location of the defective mirror element 10. In general, this can be accomplished by dividing the surface of the DMD array 20 into two-dimensional coordinates, with each mirror element 10 corresponding to a location coordinates. For example, a mirror element 10 in row x, column y, could be assigned the location coordinates (x,y).

Once the location of a white-defect mirror element 10 is determined, it is individually targeted with a laser beam and irradiated. The radiation is a short high-energy ultraviolet laser pulse.

The specific wavelength, pulse duration, and power of the radiation are selected so as to result in selective removal of the mirror 11. In other words, it is desired to remove mirror 11 without affecting the underlying circuitry or neighboring pixels. Also, it is desirable to obtain this selective removal without particle residue. The size and material of mirror 11 will affect the required wavelength, pulse duration, and power. Another factor is whether the DMD array is packaged and therefore protected by a transparent window through which the radiation must pass.

The removal of mirror 11 in accordance with the invention is the result of ablation of the mirror material. The high-energy radiation breaks down the molecules of mirror 11. In general, objective of selecting the wavelength is to provide a wavelength that is sufficiently short so as to provide complete ablation of mirror 11 without particle contamination.

A typical mirror element 10, such as the torsion-beam type illustrated in FIGS. 1–3, has a mirror 11 whose surface area is approximately 16 micrometers square and is made from aluminum. For such a mirror element, laser radiation in the ultraviolet range (355 nM–266 nM) has been experimentally determined to provide satisfactory results. At these wavelengths and with a mirror "spot size" of 16 micrometers, a suitable pulse duration is 5 nanoseconds at 6 microjoules. A mirror element having a mirror with a larger spot size might require more power. For example, a hidden-hinge type mirror element requires approximately 10 microjoules. For DMD aluminum mirrors in general, the pulse duration is likely to be 30 nanoseconds or less.

The method of the invention may be performed with laser equipment manufactured by the Electro Scientific Industries Corporation, Portland, Oregon, comprising a laser and x,y positioning equipment. This equipment permits the laser to be positioned with sufficient accuracy so that an individual mirror element 10 can be targeted and irradiated as described above.

As a result of the ablation, the pixel represented by the ablated mirror element is perceived as grey when the DMD is illuminated. This is less objectionable to the viewer than the bright spot that would otherwise occur. Depending on the desired reflectively of the white-defect mirror element 10 after repair, it may be desired to also ablate the hinges 12. Because hinges 12 are also made from a reflective material, the shade of grey may be controlled according to whether or not they are also ablated.

As an alternative to laser radiation, selective ablation in accordance with the invention could also be accomplished with a focussed ion beam. An advantage of this approach is that it may result in less particle residue. Also, the ablation process is slower than with a laser, so that the layer-by-layer ablation of the mirror 11 can be readily controlled. Thus, if it is desired to only partially ablate mirror 11 or hinges 12, a focussed ion beam is a good alternative to a laser.

OTHER EMBODIMENTS

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A method of repairing a digital micromirror device (DMD) having one or more mirror elements in a "stuck on" position, comprising the steps of:

detecting the location of each mirror element that is "stuck on," thereby obtaining a map of defective mirror elements; and irradiating each said defective mirror elements with a beam of laser radiation, such that the mirror of the defective mirror element is removed without substantially affecting underlying circuitry of that mirror element or neighboring mirror elements.

2. The method of claim 1, wherein said irradiating step is performed with ultraviolet radiation.

3. The method of claim 1, wherein said irradiating step is performed with a pulse duration of 30 nanoseconds or less.

4. The method of claim 1, wherein said irradiation step is performed with a power of 10 microjoules or less for a spot size of approximately 16 micrometers square.

5. The method of claim 1, wherein said irradiation step is performed with a power between a range of 6 to 10 microjoules for a spot size of approximately 16 micrometers square.

6. The method of claim 1, wherein said mirror elements are aluminum, with a spot size of approximately 16 micrometers square, and wherein said pulse duration is approximately 5 nanoseconds.

7. The method of claim 1, wherein said irradiating step is performed such that one or more hinges of said mirror element are also removed.

8. A method of repairing a digital micromirro device (DMD) having one or more mirror elements in a "stuck on" position, comprising the steps of:

detecting the location of each mirro element that is "stuck on," thereby obtaining a map of defective mirror elements; and irradiating each said defective mirror elements with an ion beam, such the mirror of the defective mirror element is removed layer-by-layer of its surface area, without substantially affecting underlying circuitry of that mirror element or neighboring mirror elements.

9. The method of claim 8, wherein said irradiating step is performed so as to remove all of said mirror.

10. The method of claim 8, wherein said irradiating step is performed so as to remove said mirror to a predetermined depth of said mirror.

\* \* \* \* \*